United States Patent [19]

Hauser et al.

[11] 4,164,392

[45] Aug. 14, 1979

[54] TEXTILE MATERIALS HAVING DURABLE SOIL RELEASE AND MOISTURE TRANSPORT CHARACTERISTICS AND PROCESS FOR PRODUCING SAME

[75] Inventors: Peter J. Hauser, Spartanburg; Francis W. Marco, Pauline, both of S.C.

[73] Assignee: Milliken Research Corporation, Spartanburg, S.C.

[21] Appl. No.: 863,281

[22] Filed: Dec. 22, 1977

[51] Int. Cl.$^2$ .............................................. D06P 5/00
[52] U.S. Cl. ........................................ 8/18 R; 8/91; 8/115.6; 8/167; 427/390 B; 428/475; 428/481
[58] Field of Search ................... 8/115.6 A, 91, 18 R, 8/167

[56] References Cited

U.S. PATENT DOCUMENTS

| | | | |
|---|---|---|---|
| 2,313,076 | 3/1943 | Klinkenstein | 8/3 |
| 3,068,120 | 12/1962 | Jacobson | 8/115.6 A |
| 3,113,674 | 12/1963 | Kiefer et al. | 8/91 |
| 3,407,026 | 10/1968 | Mauldin | 8/115.6 A |
| 3,885,911 | 5/1975 | Habib | 8/115.6 |
| 3,905,762 | 9/1975 | Lehinant et al. | 8/18 |
| 3,928,213 | 12/1975 | Dwight et al. | 252/8.8 |

FOREIGN PATENT DOCUMENTS 2616881 11/1976 Fed. Rep. of Germany .
7105276 2/1971 Japan ............................................. 8/91

OTHER PUBLICATIONS

Porter et al., Textile Research Journal, 1957, 27, (No. 11), pp. 833–845.

Goldstein et al., Textilveredlung, 1970, 5, (No. 6), pp. 481–486.

*Primary Examiner*—A. Lionel Clingman
*Attorney, Agent, or Firm*—H. William Petry

[57] ABSTRACT

Textile materials formed of polyester or nylon fibers having improved durable soil release and moisture transport characteristics are provided by application to the textile material of at least about 0.001 weight percent of a cellulose acetate polymeric constituent having a degree of substitution of the acetyl moiety of from about 0.9 to about 2.3. Such cellulose acetate polymeric constituent are represented by the formula

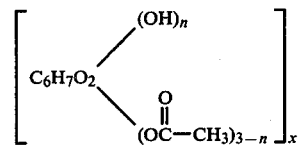

wherein x is an integer of at least 50, n is an integer of from about 2.1 to about 0.7, and the expression 3-n is the degree of substitution of the acetyl moiety. The cellulose acetate polymeric constituent can be applied to the fabric from a pad bath containing the polymeric constituent and a solvent capable of solubilizing the polymeric constituent; by exhaustion techniques during the dyeing of the textile material; or by exhaustion techniques from an aqueous admixture containing finely dispersed particles of the cellulose acetate polymeric constituent.

24 Claims, No Drawings

TEXTILE MATERIALS HAVING DURABLE SOIL RELEASE AND MOISTURE TRANSPORT CHARACTERISTICS AND PROCESS FOR PRODUCING SAME

This invention relates to textile materials formed of polyester or nylon fibers having durable soil release and moisture transport characteristics. In one aspect it relates to a method for imparting durable soil release and moisture transport characteristics to a textile material formed of polyester or nylon fibers.

The genesis of synthetically produced textile fibers has brought about a tremendous effort in the textile industry along numerous avenues. There has been much research effort directed to the improvement of synthetic fibers, especially the polyester fibers, to improve the soil release characteristics of textile materials produced from such fibers without adversely effecting the hand of the textile material. Further, much work has been done to improve such fibers so that redeposition of the soil does not occur during the normal dry cleaning process. Thus, a major concern has been the difficulty of cleaning garments made from polyester fibers using conventional home washing procedures due to the oleophilic nature of the garments made from the textile materials of polyester fibers. Similarly, problems have been incurred due to the redeposition of soil from the dry cleaning solution on garments made from polyester fibers. Numerous efforts have been proposed to alter the oleophilic properties of the textile materials produced from polyester fibers so that the dirt and/or oily deposits on the soiled clothes can readily be removed by either at home washing procedures or a commercial dry cleaning procedure. However, in altering the oleophilic characteristics of the textile material care must be exercised to insure that the hand of the fabric does not become hard which would result in discomfort to the wearer of the garment.

Numerous attempts have been made to solve the problem of soiling of synthetic fibers and a substantial amount of research has been conducted and numerous polymeric constituents have been employed in order to provide textile materials produced of synthetic made fibers with desired soil release characteristics and/or anti-redeposition properties. For example, many polymer systems have been proposed which are capable of forming a film around the fibers that constitute the textile material, particularly acid emulsion polymers prepared from organic acids having reactive points of unsaturation. Typical of such acid emulsion polymers and processes employing same is the application of an admixture comprising an amino/plast textile resin, a textile resin catalyst and a synthetic acid emulsion polymer. After application, the resin composition is cured. Numerous other soil release agents and methods for application have also been proposed such as the use of polyethylene glycol esters of terephthalic acid. While improved soil release characteristics are often provided fabrics treated with such soil release agents problems have, nevertheless, been encountered when the fabric is subjected to dry cleaning processes in that the soil removed from the garment is redeposited on the garment from the dry cleaning solution.

Thus, even in view of the above and numerous and other processes and compositions which have heretofore been advanced, research is constantly being conducted to develop new and improved composition and processes which will not only impart durable soil release and moisture transport characteristics to textile materials containing synthetic fibers, but will also serve as an anti-soil redeposition agent when garments produced from such fabrics are subjected to a dry cleaning process.

Accordingly, by virtue of the teachings of the present invention, problems historically present with the use of garments produced from textile materials of polyester or nylon fibers are substantially alleviated and not only are durable soil release and moisture transport characteristics imparted to the textile material, but also improved anti-redeposition characteristics.

It is therefore an object of the present invention to provide a textile material formed of polyester or nylon fibers having durable soil release and moisture transport properties. It is still another object of the present invention to provide improved anti-redeposition properties to such textile materials so that soil from a dry cleaning solvent or an aqueous washing solution are not redeposited on the material. Still another object of the present invention is to provide a process for imparting a durable soil release and moisture transport characteristics to textile materials formed of polyester or nylon fibers. These and other objects, advantages and features of the present invention will be apparent to those skilled in the art from the reading of the following detailed description of the present invention.

Generally speaking, the present invention is directed to textile materials formed of polyester or nylon fibers having durable soil release and moisture transport characteristics and to a process for producing same. Further, the present invention is directed to textile materials having improved anti-soil redeposition characteristics when garments produced from such textile materials are subjected with a dry cleaning process or a laundering process. Broadly, such is achieved by applying to a textile material formed of polyester or nylon fibers and an effective amount of a cellulose acetate polymeric constituent so as to provide at least about 0.001 weight percent of the cellulose acetate polymeric constituent on the textile material. The cellulose acetate polymeric constituents useful for imparting improved durable soil release and moisture transport characteristics to textile materials containing polyester or nylon fibers are characterized as having a degree of substitution of the acetyl moiety of from about 0.9 to about 2.3 and such constituents are represented by the formula

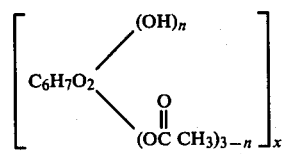

wherein x is an integer of at least 50, n is an integer of from 2.1 to about 0.7 and the expression 3-n is the degree of substitution of the acetyl moiety. The $C_6H_7O_2$ moiety of the above described cellulose acetate polymeric constituent is to be understood to be a cyclic ether having as its structural configuration

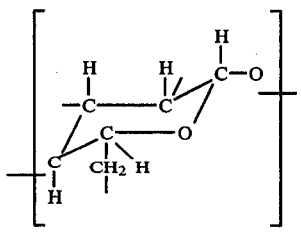

Although any cellulose acetate polymeric constituent characterized as above will provide durable soil release and moisture transport characteristics to the textile material while, at the same time providing improved anti-soil redeposition characteristics when such textile material is subjected to dry cleaning solvent, especially desirable results can be obtained when the particular cellulose acetate polymeric constituents employed have a degree of substitution of the acetyl moiety of from about 1.25 to about 2.0 and x is from about 100 to about 200.

The amount of cellulose acetate polymeric constituent imparted to the textile material to provide such textile material with durable soil release and moisture transport characteristics, as well as improved anti-soil redeposition characteristics, can vary widely provided at least about 0.001 weight percent of the cellulose acetate polymeric constituent is present on the material. However, desirable results can be obtained when the amount of such polymeric constituent present on the textile material is from about 0.001 to about 10 weight percent, more desirably from about 0.05 to about 1 weight percent.

The application of the cellulose acetate polymeric constituent to the textile material containing polyester or nylon fibers can be by any suitable method, such as padding, exhaustion, spraying and the like. However, especially desirable results can be obtained when the cellulose acetate polymeric constituent is applied to the textile material containing polyester or nylon fibers using either a padding technique, exhaustion techniques including exhaustion of the polymeric constituent from an aqueous dispersion containing finely divided solid particles of the polymeric constituent as is hereinafter set forth.

One method of application of the cellulose acetate polymeric constituent to the textile material is to first provide a liquid admixture consisting essentially of from about 0.001 to about 10 weight percent of the cellulose acetate polymeric constituent and a solvent constituent capable of solubilizing the cellulose acetate polymeric constituent. Thereafter, the textile material is contacted or padded with the liquid admixture so as to provide a resulting wet textile material containing at least about 0.01 weight percent of the cellulose acetate polymeric constituent. The resulting wetted textile material containing the desired amount of the cellulose acetate polymeric constituent is then dried using any conventional drying technique, such as air drying or passing the wet textile material through an oven, for a period of time effective to remove substantially all of the solvent constituent and provide a dry textile material containing the before mentioned amount of cellulose acetate polymeric constituent. As previously stated, any suitable drying technique can be provided, the only requirement being that one must exercise care to insure that the temperature at which the wetted textile material is dried does not exceed the decomposition temperature of the cellulose acetate polymeric constituent or the fibers from which the material is made. While the amount of the cellulose acetate polymeric constituent incorporated onto the textile material can very widely, provided at least 0.001 percent of said material is applied to the fabric, especially desirable results can be obtained when the textile material contains from about 0.05 to about 1 weight percent of a polymeric constituent.

The solvent employed in the liquid admixture can be any suitable solvent which is capable of solubilizing the cellulose acetate polymeric constituent and which does not have a deleterious effect upon the fibers of the textile substrate to be contacted with the cellulose acetate polymeric constituent and solvent. For example, the solvent can be any of a group of well known organic solvents, such as low molecular weight ketones, low molecular weight alcohols, organic acids, alkyl lactates, water soluble ethers, and mixtures thereof. Further, the solvent can be an aqueous admixture containing any of the before mentioned organic solvents. Thus, the solvent can contain from about 0 to 50 weight percent water and from about 100 to 50 weight percent of the organic constituent. Typical of the organic solvents which can be employed as the solubilizing solvent for the cellulose acetate polymeric constituent in accordance with the subject process are acetone, methyl ethyl ketone, methyl isopropyl ketone, diethyl ketone, and ethyl isopropyl ketone, methanol, ethanol, isopropanol, and the like, acetic acid, methyl lactate, ethyl lactate, and the like, 2-methoxyethanol, 1,4-dioxane, and other organic solvents, such as pyridine, ethylene formal, and the like, and mixtures of such organic solvents. While any of the above organic solvents can be employed either alone or in combination with water, especially desirable results can be obtained when the solvent is acetone, ethanol, acetic acid, ethyl lactate, and aqueous admixtures thereof.

Once the cellulose acetate polymeric constituent has been applied into the textile material and substantially all of the solvent constituent has been removed, further processing steps which are well known in the textile industry can be employed, if desirable, such as heat setting, curing, and the like.

In addition to the application of the cellulose acetate polymeric constituent by a padding process such as described above, We have found that the cellulose acetate polymeric constituent can also be applied to textile materials formed of polyester or nylon fibers by exhaustion techniques during a high/temperature aqueous dyeing process. However, it should be understood that other dyeing processes in which dispersed dyes are exhausted onto a textile material could also have incorporated therein the desired amount of the cellulose acetate polymeric constituent in order to allow exhaustion of such constituent onto the textile material and thereby impart the desired improved durable soil release and moisture transport characteristics to the textile material. Thus, the particular technique employed to conduct the dyeing of the textile substrate and thus the application of the cellulose acetate polymeric constituent onto the textile material will vary widely depending upon the particular process employed for exhaustion dyeing and the application of the cellulose acetate polymeric constituent is not critical provided that the cellulose acetate polymeric constituent is compatible with the aqueous dye admixture employed and the textile material containing the polyester or nylon fibers is maintained in contact with the aqueous dye admixture containing the cellulose acetate polymeric constituent for a period of time effective to allow exhaustion of the dye stuff and the cellulose acetate polymeric constituent onto the textile material from the aqueous dye admixture. Such exhaustion dyeing techniques are well known in the art. However, to further illustrate the subject invention the following exhaustion procedure is set forth.

An aqueous bath is heated to a temperature of from 30° to about 50° C., the aqueous bath containing a suitable surface active agent, leveler, and other ingredients chosen by the processor. A dispersed dye is then added to the bath and the temperature of the bath is raised to about 60° to 65° C. After the bath has been raised to the desired temperature, the pH of the bath is adjusted to a pH in the range to about 4.0 to 4.5 by the addition of acetic acid. Thereafter, the dyeing machine is sealed and the temperature is again raised to about 130° C. at a rate of about 2° C. per minute. Dyeing is then carried out under pressure for a period of from about 30 to 90 minutes. Once the dyeing cycle has been completed, the dye bath is cooled to a temperature of about 60° to 70° C. before opening and thereafter the material is scoured and rinsed.

When employing such a procedure in conjunction with the method of the present invention wherein a cellulose acetate polymeric constituent is incorporated into the aqueous dye bath, the cellulose acetate polymeric constituent is introduced in an amount effective to provide at least about 0.001 weight percent of the polymeric constituent on the fabric by exhaustion of the polymeric constituent onto the textile material during the dyeing process. Preferably, the cellulose acetate polymeric constituent is added to the aqueous dye bath admixture after the adjustment of the pH of the dye bath with the acetic acid.

The amount of cellulose acetate polymeric constituent added to the dye bath can vary widely provided that an effective amount is incorporated into the dye bath to provide at least about 0.001 percent, by weight, of the polymeric constituent on the textile material after the dyeing and exhaustion process is complete. Generally, however, it is desirable that from about 0.01 to about 10 weight percent of the cellulose acetate polymeric constituent be incorporated into the dye bath so as to provide such an amount of the polymeric constituent onto the textile material. Especially desirable results have been obtained when the cellulose acetate polymeric constituent is incorporated into the bath in an amount sufficient to provide from about 0.05 to about 1 weight percent of the cellulose acetate polymeric constituent onto the fabric during the dyeing and exhaustion procedure.

While the cellulose acetate polymeric constituent can be employed in the before-described amounts to the aqueous dye bath as previously set forth, we have found that if a solvent is employed to solubilize the cellulose acetate polymeric constituent prior to introduction of the cellulose acetate polymeric constituent into the aqueous dye bath the dispersion of the cellulose acetate polymeric constituent in the aqueous dye bath is greatly enhanced thereby improving the application of the cellulose acetate polymeric constituent to the textile material. Any suitable solvent can be employed which is capable of solubilizing the cellulose acetate polymeric constituent as previously discussed. The solvent can be low molecular weight ketones, low molecular weight alcohols, organic acids, alkyl lactates, mixtures thereof, and aqueous admixtures of such solvents. Thus, the solubilizing solvent can contain from about 0 to about 50 weight percent water and from about 100 to 50 weight percent of an organic constituent as previously mentioned. While any solvent capable of solubilizing the cellulose acetate polymeric constituent can be employed, especially desirable results can be obtained when the solubilizing agent is acetic acid since acetic acid is already present in the aqueous bath solution and thus is completely compatible with the system. The only requirement as to the solubilizing solvent is that it must be compatible with the aqueous dye bath, the cellulose acetate polymeric constituent and the textile substrate to which the dye and cellulose acetate polymeric constituent are to be applied.

After the dyeing and application of the cellulose acetate polymeric constituent to the textile material has occurred, the textile material is removed from the pressurized dye bath, and rinsed to remove surface dye and the like. The fabric is then cooled, and then dried, such as by air drying or passing the textile material through a drying oven which has been heated to the temperature from about 110° to 120° C. for a period of time effective to remove substantially all of the solvent and water from the textile material. When desired, the textile material may be subjected to other processing steps such as heat setting, curing and the like without deleteriously affecting the properties achieved by the application of the cellulose acetate polymeric constituent to the textile material.

In the application of the cellulose acetate polymeric constituent by the before-described exhaustion procedure, any cellulose acetate polymeric constituent having a degree of substitution of the acetyl moiety of from about 0.9 to about 2.3 and represented by the formula

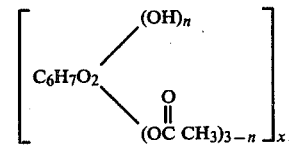

wherein x is an integer of at least about 50, n is an integer of from 2.1 to about 0.7 and the expression 3-n is the degree of substitution of the acetyl moiety can be employed. The $C_6H_7O_2$ moiety of the above described cellulose acetate polymeric constituent is to be understood to be cyclic ether having as its structural configuration

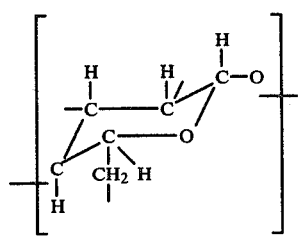

Especially desirable results can be obtained when the cellulose acetate polymeric constituent has a degree of substitution of the acetyl moiety of from about 1.25 to about 2.5 and x is an integer from about 100 to about 200.

The cellulose acetate polymeric constituent can also be exhausted onto the fabric from an aqueous dispersion containing finely dispersed particles of the polymeric constituent. The amount of the cellulose acetate polymeric constituent particles in the aqueous dispersion can vary widely provided that an effective amount is incorporated into the aqueous constituent to provide at least about 0.001 weight percent of the polymeric constituent on the textile material. Generally, however, it is desirable that the amount of cellulose acetate incorporated into the aqueous constituent be an amount effective to provide from about 0.01 to about 10 weight percent, more desirably from about 0.05 to about 1 weight percent, of the cellulose acetate polymeric constituent on the fabric.

When employing an aqueous dispersion containing finely dispersed particles of the cellulose acetate polymeric constituent as the vehicle to apply the polymeric constituent to the fabric it is necessary that the particles of the polymeric constituent be sufficiently small in size to ensure a stable dispersion. Generally, particles of the polymeric constituent having the required size to form a stable dispersion can be obtained by any suitable grinding technique, such as by the use of a ball mill, a colloid mill, or the like. Desirably, the cellulose acetate polymeric constituent employed in the aqueous dispersion will have a particle size of from about 1 to about 20 microns in diameter.

In addition to the before-described methods for application of the cellulose acetate polymeric constituent to impart improved durable soil release and moisture transport characteristics to textile materials containing polyester or nylon fibers, while at the same time providing anti-soil redeposition properties to such material, numerous other methods for application of the cellulose acetate polymeric constituent can be envisioned. Thus, such methods of application are not to be deemed limiting to the application of the before-described cellulose acetate polymeric constituent to a textile material containing polyester or nylon fibers, but such are merely illustrative of the application of such polymeric constituent to impart the desired properties to such material.

In order to more fully describe the subject invention the following examples are given. However, these examples are merely for illustrative purposes only and are not to be construed as duly limiting the scopes of the appended claims. In the examples, unless otherwise indicated, all percentages are percentage by weight.

EXAMPLE I

A series of experiments were conducted in which a plurality of pad baths were prepared, each of such pad baths containing a specified amount of cellulose acetate in which the degree of substitution of the acetate moiety of the cellulose acetate was varied from one pad bath to another. Each of the pad baths were padded onto samples of 100 percent textured polyester double knit fabric to about 100 percent wet pickup. The padded fabrics were then air dried and those samples padded with a bath solution containing the cellulose acetate were found to have about 0.2% solid pickup based on the dry weight of the fabric. Each sample was then evaluated for soil release of mineral oil and used crank case motor oil. Further, each sample was evaluated for moisture transport.

In conducting the evaluation of the samples for soil release, each of the above treated fabrics was tested as follows:

A portion of each sample was stained prior to any washing and its soil release characteristics determined.

Other portions of each sample were washed 4 times, 9 times, 19 times, 34 times and 49 times prior to staining and soil release evaluation.

The washing procedure used in evaluation of each of the above samples was to subject the samples to a home laundry process and procedure using a standard automatic home washing machine and a standard detergent (AATCC Standard Detergent 124). The washing water temperature was 120° F. (49° C.).

Summarized below are the results obtained from the above-described soil release evaluation.

TABLE I

| Sample | Pad Bath Composition | | Cellulose-Acetate | | Soil Release Rating of Mineral Oil Stain* Washes Prior to Staining | | | | | |
|---|---|---|---|---|---|---|---|---|---|---|
| | % Acetone | % Water | %[1] OWF | Degree of Substitution | 0 | 4 | 9 | 19 | 34 | 49 |
| Control (no treating agent) | 0 | 100 | 0 | | 1.3 | 1.3 | 3.8 | 2.0 | 2.0 | 4.3 |
| Cellulose Acetate 18% Acetyl | 0 | 100 | 0.2 | 0.62 | 4.0 | 4.5 | 4.0 | 3.5 | 3.8 | 4.0 |
| Cellulose Acetate 25% Acetyl | 50 | 50 | 0.2 | 1.25 | 4.0 | 4.5 | 4.5 | 3.8 | 4.0 | 4.5 |
| Cellulose Acetate 30% Acetyl | 50 | 50 | 0.2 | 1.60 | 4.0 | 4.5 | 4.5 | 3.8 | 4.5 | 4.3 |
| Cellulose Acetate 33% Acetyl | 70 | 30 | 0.2 | 1.82 | 4.5 | 4.3 | 4.5 | 4.0 | 4.3 | 4.5 |
| Cellulose Acetate 36% Acetyl | 100 | 0 | 0.2 | 2.08 | 3.5 | 4.5 | 4.0 | | 4.3 | 4.3 |
| Cellulose Acetate 38% Acetyl | 100 | 0 | 0.2 | 2.26 | 4.5 | 4.0 | 4.0 | | 4.5 | 4.0 |
| Cellulose Acetate 40% Acetyl | 100 | 0 | 0.2 | 2.46 | 3.0 | 1.3 | 3.8 | 4.0 | 4.5 | 4.0 |

[1]Percent of cellulose acetate on fabric sample based on the weight of the fabric sample
*Ratings employed are determined according to procedure set forth in AATCC Method 130-1974

TABLE IA

| Sample Polyester Fabric & Treating Agent | Pad Bath Composition | | Cellulose-Acetate | | Soil Release Rating of Used Crankcase Oil** Washes Prior to Staining | | | | | |
|---|---|---|---|---|---|---|---|---|---|---|
| | % Acetone | % Water | %[1] OWF | Degree of Substitution | 0 | 4 | 9 | 19 | 34 | 49 |
| Control (no treating agent) | 0 | 100 | 0 | | P | P | P | P | P | P |
| Cellulose Acetate 18% Acetyl | 0 | 100 | 0.2 | 0.62 | G | F | P | P | P | P |
| Cellulose Acetate 25% Acetyl | 50 | 50 | 0.2 | 1.25 | E | E | E | G | F | P |
| Cellulose Acetate 30% Acetyl | 50 | 50 | 0.2 | 1.60 | E | E | E | G | F | G |
| Cellulose Acetate 33% Acetyl | 70 | 30 | 0.2 | 1.82 | E | E | E | G | G | G |

TABLE IA-continued

| Sample Polyester Fabric & Treating Agent | Pad Bath Composition | | Cellulose-Acetate | | Soil Release Rating of Used Crankcase Oil** Washes Prior to Staining | | | | | |
|---|---|---|---|---|---|---|---|---|---|---|
| | % Acetone | % Water | %[1] OWF | Degree of Substitution | 0 | 4 | 9 | 19 | 34 | 49 |
| Cellulose Acetate 36% Acetyl | 100 | 0 | 0.2 | 2.08 | P | P | P | P | P | P |
| Cellulose Acetate 38% Acetyl | 100 | 0 | 0.2 | 2.26 | P | P | P | P | P | P |
| Cellulose Acetate 40% Acetyl | 100 | 0 | 0.2 | 2.46 | P | P | P | P | P | P |

[1]Percent of cellulose acetate on fabric sample based on the dry weight of the fabric sample
**Ratings employed are visual measurements of the stain remaining on the fabric after washing
E = Excellent soil removal - substantially all stain removed
G = Good soil removal - considerable portion of stain removed
F = Fair soil removal - small portion of stain removed
P = Poor soil removal - substantially no stain removed The moisture transport evaluation of the before-mentioned treated fabrics was tested as follows:

A portion of each sample was evaluated for moisture transport prior to any washing.

Other portions of each sample were washed 5 times, 10 times, 20 times, 35 times, and 50 times prior to evaluation for moisture transport.

The procedure used in each instance to determine the moisture transport properties of the treated samples was to place a drop of water on the fabric and then measure the time required for the fabric to completely absorb the water.

Summarized on the following page are the results obtained from the above-described moisture evaluation.

Thereafter, an admixture containing an effective amount of cellulose acetate having an acetyl content of 33% (degree of substitution of 1.82) solubilized in acetic acid solvent was added to each dye bath so that the amount of cellulose acetate constituent in the aqueous bath solution was 0.3%, based on the dry weight of the fabric, and the total amount of acetic acid in the bath was less than about 1% of the total weight of the bath. The liquor to fabric ratio of each dye bath was 20:1.

A 100 percent textured polyester double knit sample was then contacted with the above prepared dye bath. The dyeing process was a simulated commercial dyeing process in which the contacting of the fabric sample with the bath was carried out in a sealed container. During the dyeing process, the bath was agitated and

TABLE IB

| Sample Polyester Fabric & Treating Agent | Pad Bath Composition | | Cellulose-Acetate | | Moisture Transport (seconds)* Washes Prior to M.T. (2) Determination | | | | | | |
|---|---|---|---|---|---|---|---|---|---|---|---|
| | % Acetone | % Water | % (1) OWF | Degree of Substitution | 0 | 1 | 5 | 10 | 20 | 35 | 50 |
| Control (no treating agent) | 0 | 100 | 0 | | +10 | +10 | +10 | | +10 | 1.5 | 4.6 |
| Cellulose Acetate 18% Acetyl | 0 | 100 | 0.2 | 0.62 | 1 | 1 | 0 | 0 | 0 | 1 | 1.2, 1.3, 10** |
| Cellulose Acetate 25% Acetyl | 50 | 50 | 0.2 | 1.25 | 1.5 | 1.2 | 1.2 | 1 | 0 | 0 | 0 |
| Cellulose Acetate 30% Acetyl | 50 | 50 | 0.2 | 1.60 | 1 | 1 | 0 | 0 | 0 | 0 | 0 |
| Cellulose Acetate 33% Acetyl | 70 | 30 | 0.2 | 1.82 | 1 | 1 | 0 | 1 | 1 | 1 | 1 |
| Cellulose Acetate 36% Acetyl | 100 | 0 | 0.2 | 2.08 | 3.5 | 1 | 4.6 | 1 | 1 | 1 | 1 |
| Cellulose Acetate 38% Acetyl | 100 | 0 | 0.2 | 2.26 | +10 | 1 | 1 | 1.2 | 1 | 1 | 1 |
| Cellulose Acetate 40% Acetyl | 100 | 0 | 0.2 | 2.46 | +10 | 8.5 | 9.4 | +10 | 9 | 2 | 2.5 |

(1) percent of cellulose acetate on fabric sample based on the dry weight of fabric sample.
(2) M.T. - Moisture transport
*Average of 3 measurements
**Not average - results of three measurements

EXAMPLE II

An experiment was conducted to determine if the cellulose acetate constituent could be exhausted onto the fabric during a standard dyeing procedure and still provide the fabric with the desired soil release characteristics. In the experiment, an aqueous dye bath was formulated containing the following constituents, each being reported as weight percent based on the dry weight of the fabric.

Dye Bath Constituents
Water
0.03% Palanil Pink REL—a disperse dye (CI Disperse Red 91)
0.04% Palanil Yellow 3G—a disperse dye (CI Disperse Yellow 64)
0.01% Samaron Blue HBL—a disperse dye from American Hoechst Corporation
1% Acetic Acid
1% Leveling Agent—Milliken Chemical Leveler Wll heated from room temperature to an elevated temperature of 130° C. The fabric was maintained in contact with the heated bath for 30 minutes after the desired temperature of the bath was obtained. Thereafter, heat was removed, the bath allowed to cool, and the fabric was then removed. The fabric sample, so treated, was then rinsed with water and dried in a standard home clothes dryer. The dried sample was then evaluated for soil release.

A portion of the treated and dyed sample was stained prior to any washing and its soil release characteristics determined.

Then portions of the sample were washed nine times prior to staining and soil release evaluation. The washing procedure employed in each instance was the same procedure as set forth in Example I.

Summarized below are the soil release characteristics of the fabric sample obtained using the procedures above.

TABLE II

| Sample | Soil Release Rating-Washes Prior to Staining | | | |
|---|---|---|---|---|
| | Mineral Oil Stain* | | Used Crank Case Oil Stain | |
| | 0 | 9 | 0 | 9 |
| Control | 1.5 | 2.3 | P | P |
| Treated and Dyed Sample | 4.5 | 4.3 | G | G |

*Ratings employed are determined according to procedure set forth in AATCC Method 130-1974
**Ratings employed are visual measurements of the stain remaining on the fabric after washing.
E=Excellent soil removal - substantially all stain removed
G=Good soil removal - considerable portion of stain removed
F=Fair soil removal - small portion of stain removed
P=Poor soil removal - substantially no stain removed

EXAMPLE III

An experiment was conducted to determine if the cellulose acetate constituent could be exhausted onto a nylon fabric during a simulated dyeing procedure and provide the fabric with the desired soil release characteristics.

A 100% filament nylon fabric was contacted with an aqueous bath containing an effective amount of cellulose acetate having an acetyl content of 33% (degree of substitution of 1.82) and a minor amount of acetic acid so that the amount of the cellulose acetate constituent was 0.3%, based on the dry weight of the fabric, and the amount of acetic acid was less than about 1% of the total weight of the bath. The liquor to fabric ratio of the bath was 20:1.

The simulated dyeing process was identical to that described in Example II with respect to time, temperature, cooling, rinsing and drying. The dried sample was then evaluated for soil release.

A portion of the treated and dried fabric was stained prior to any washing and its soil release characteristics determined.

Then a portion of the sample was washed four times prior to staining and soil release evaluation. The washing procedure employed in each instance was the same procedure as set forth in Example I.

Summarized on the following page is the soil release characteristics of the treated fabric sample obtained by the above procedure.

TABLE III

| Sample | Soil Release Rating Washings Prior to Staining | | | |
|---|---|---|---|---|
| | Mineral Oil Stains | | Used Crankcase Oil Stains** | |
| | 0 | 11 | 0 | 4 |
| Control | 2.3 | 1.0 | P | P |
| Treated Sample | 3.5 | 4.0 | G | G |

*Ratings employed are determined according to procedures set forth in AATCC Method 130-1974
**Ratings employed are visual measurements of the stain remaining in the fabric after washing
E=Excellent soil removal - substantially all stain removed
G=Good soil removal - considerable portion of stain removed
F=Fair soil removal - small portion of stain removed
P=Poor soil removal - substantially no stain removed

EXAMPLE IV

An experiment was conducted to determine if the cellulose acetate compositions of the prior examples would influence the extent of soil redeposition to polyester fabric during laundering and dry cleaning. A piece of textured polyester double knit was treated with 0.3%, based on dry fabric weight, cellulose acetate having a degree of substitution of 1.82% according to the procedure described in Example III.

A portion of the dried and treated fabric was subjected to seven commercial dry cleanings. A second portion of the treated fabric was subjected to seven commercial launderings. Table IV summarizes the collected data.

TABLE IV

| Sample | Change in Whiteness Seven Dry Cleanings | (ΔW)* After Seven Launderings |
|---|---|---|
| Control Fabric | −20.42 | −7.51 |
| Treated Sample | −8.51 | −3.54 |

*$\Delta W$ is defined by the equation $\Delta W = \Delta L - 3\Delta b$ wherein $\Delta L$ and $\Delta b$ are the change in the Hunter L and b color values after either laundering or dry cleaning. The Hunter L, a, b color scale is defined and discussed in "The Measurement of Appearance", Richard S. Hunter, Wiley Interscience, New York, 1975.

EXAMPLE V

An experiment was conducted to determine if the cellulose acetate constituent could be exhausted from a ball milled dispersion onto fabric during a standard dye cycle and still provide the fabric with the desired soil release characteristics. The ball milled dispersion was prepared by subjecting a 15% by weight mixture of cellulose acetate having an acetyl content of 33% (degree of substitution of 1.82) in water to a ball milling process until the average size of the resulting cellulose acetate particles was about 2 microns.

A 100% textured polyester double knit fabric was contacted with an aqueous bath containing 0.3%, based on the dry weight of the fabric, of cellulose acetate having an acetyl content of 33% (degree of substitution 1.82) ball milled as described above. Also present in the bath was a minor amount of acetic acid, about 1%, based on the dry weight of the fabric.

The treatment was carried out in a small commercial jet dyeing machine, the liquor to fabric ratio being 90:1. The bath was agitated and heated from room temperature to an elevated temperature of 130° C. The fabric was maintained in contact with the heated bath for 30 minutes after the desired bath temperature was reached. Thereafter, the bath was cooled, the fabric rinsed with water and dried and heat set on a commercial tenter frame using standard time-temperature conditions.

A portion of the treated sample was stained prior to any washing and its soil release characteristics determined.

Then portions of the sample were washed four times prior to staining and soil release evaluation. The washing procedure employed in each instance was the same procedure as set forth in Example I.

Summarized below are the soil release characteristics of the fabric sample obtained using the procedures above.

TABLE V

| Sample | Soil Release Rating-Washings Prior to Staining | | | |
|---|---|---|---|---|
| | Mineral Oil Stains* | | Used Crankcase Oil Stains** | |
| | 0 | 4 | 0 | 4 |
| Control Treated | 1.0 | 1.5 | P | P |

TABLE V-continued

| | Soil Release Rating-Washings Prior to Staining | | | |
|---|---|---|---|---|
| Sample | Mineral Oil Stains* | Used Crankcase Oil Stains** | | |
| Sample | 5.0 | 4.5 | G | G |

*Ratings employed are determined according to procedures set forth in AATCC Method 130-1074
**Ratings employed are visual measurements of the stain remaining in the fabric after washing
E = Excellent soil removal - substantially all stain removed
G = Good soil removal - considerable portion of stain removed
F = Fair soil removal - small portion of stain removed
P = Poor soil removal - substantially no stain removed The moisture transport evaluation of the treated fabric was conducted prior to any washings, and after four washings according to the procedure given in Example I.

Summarized below are the moisture transport characteristics of the treated fabric.

TABLE Va

| | Moisture Transport (seconds) Washes Prior to M.T. Determination | |
|---|---|---|
| Sample | 0 | 4 |
| Control | +10 | +10 |
| Treated Fabric | 1 | 1 |

The above Examples clearly indicate the improved soil release, moisture transport and anti-soil redeposition properties imparted to a textile material containing polyester fibers by the application of a cellulose acetate polymeric constituent as set forth. Further, it is believed that higher esters of cellulose, such as cellulose propionate and cellulose butyrate and mixtures of esters of cellulose should behave in a similar manner provided such higher esters have the desired degree of substitution.

Having thus described the invention, I claim:

1. A process for imparting improved, durable soil release and moisture transport characteristics to a textile material formed of polyester or nylon fibers which comprises applying an effective amount of a liquid admixture consisting essentially of from about 0.001 to about 10 weight percent of a cellulose acetate polymeric constituent and a solvent constituent capable of solubilizing said cellulose acetate polymeric constituent, to provide a resulting wet textile material containing at least about 0.001 weight percent of said cellulose acetate polymeric constituent, said cellulose acetate polymeric constituent being characterized as having a degree of substitution of the acetyl moiety of from about 0.9 to about 2.3 and represented by the formula

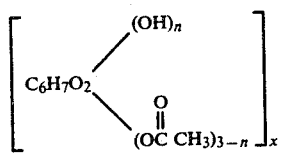

wherein x is an integer of at least about 50, n is an integer of from about 2.1 to about 0.7 and the expression 3-n is the degree of substitution of the acetyl moiety, and drying the resulting wet textile material for a period of time effective to remove substantially all of the solvent constituent and provide a dry textile material containing said cellulose acetate polymeric constituent.

2. The textile material prepared according to the process of claim 1.

3. The process of claim 1 wherein said cellulose acetate polymeric constituent is present in said liquid admixture in an amount of from about 0.05 to 1 and said resulting wet textile material contains from about 0.05 to about 1 weight percent of said polymeric constituent.

4. The process of claim 3 wherein said solvent is selected from the group consisting of low molecular weight ketones, low molecular weight alcohols, organic acids, alkyl lactates, mixtures thereof, and aqueous admixtures of such solvents.

5. The process of claim 4 wherein said solvent contains from about 0 to 50 weight percent water and from about 100 to 50 weight percent of acetone, ethanol, acetic acid, ethyl lactate and mixtures thereof.

6. The textile material prepared according to the process of claim 5.

7. The process of claim 5 wherein said cellulose acetate polymeric constituent has a degree of substitution of the acetyl moiety of from about 1.25 to about 2.0 and x is from about 100 to about 200.

8. The method of claim 1 wherein said cellulose acetate polymeric constituent is applied to the textile material by padding the textile material with said liquid admixture.

9. A process for imparting improved, durable soil release and moisture transport characteristics to a textile material formed of polyester fibers during a dyeing operation wherein the textile material is contacted with an aqueous dye admixture containing water, a dispersed dye stuff, a minor amount of acetic acid and a leveling agent which comprises incorporating into said aqueous dye admixture a minor effective amount of a cellulose acetate polymeric constituent so as to provide at least about 0.001 weight percent of said polymeric constituent on said textile material, said cellulose acetate polymeric constituent being characterized as having a degree of substitution of the acetyl moiety of from about 0.9 to about 2.3 and represented by the formula

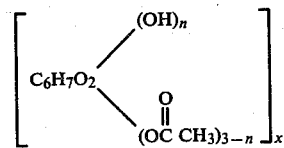

wherein x is an integer of from about 100 to about 200, n is an integer of from about 2.1 to about 0.7 and the expression 3-n is the degree of substitution of the acetyl moiety; maintaining said textile material in contact with the dye admixture containing said cellulose acetate polymeric constituent under dyeing condition for a period of time effective to allow exhaustion of said dye stuff and said cellulose acetate polymeric constituent onto the textile material;

removing the dyed textile material from said dye admixture;
rinsing the dyed textile material; and
drying the dyed textile material containing the cellulose acetate polymeric constituent.

10. The textile material prepared according to the process of claim 9.

11. The process according to claim 9 which further includes solubilizing said cellulose acetate polymeric constituent in a solvent prior to introduction of said polymeric constituent into said aqueous dye admixture to enhance exhaustion of said cellulose acetate polymeric constituent onto the textile material during the dyeing process.

12. The process according to claim 11 wherein said cellulose acetate polymeric constituent has a degree of substitution of the acetyl moiety of from about 1.25 to about 2.0 and x is from about 100 to about 200.

13. The textile material prepared according to the process of claim 9.

14. The process according to claim 11 wherein said solvent employed to solubilize said cellulose acetate polymeric constituent is selected from the group consisting of low molecular weight ketones, low molecular weight alcohols, organic acids, alkyl lactates, mixtures thereof, and aqueous admixtures of such solvents.

15. The process according to claim 14 wherein said solvent is acetone, acetic acid and aqueous admixtures thereof.

16. A textile material formed of polyester fibers having improved durable soil release and moisture transport characteristics consisting essentially of a polyester textile material substrate having incorporated thereon from about 0.001 to about 10 weight percent of a cellulose acetate polymeric constituent, said cellulose acetate polymeric constituent being characterized as having a degree of substitution of the acetyl moiety of from about 0.9 to about 2.3 and represented by the formula

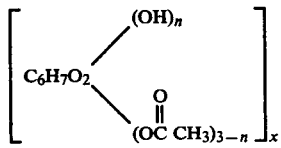

wherein x is an integer of at least about 50, n is an integer of from about 2.1 to about 0.7 and the expression 3-n is the degree of substitution of the acetyl moiety.

17. The textile material according to claim 16 wherein said cellulose acetate polymeric constituent has a degree of substitution of the acetyl moiety of from about 1.25 to about 2.5 and x is from about 100 to about 200.

18. The textile material according to claim 17 wherein said cellulose acetate polymeric constituent is present on said substrate in an amount of from about 0.05 to 1 weight percent.

19. A process for imparting improved, durable soil release and moisture transport characteristics to a textile material formed of polyester or nylon fibers which comprises contacting said textile material with an aqueous dispersion consisting essentially of water and a minor effective amount of a cellulose acetate polymeric constituent for a period of time effective to provide at least about 0.001 weight percent of said polymeric constituent on said textile material, said cellulose acetate polymeric constituent being characterized as having a degree of substitution of the acetyl moiety of from about 0.9 to about 2.3 and represented by the formula

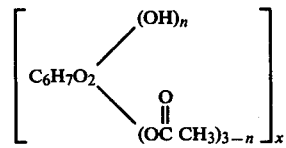

wherein x is an integer of at least about 50, n is an integer of from about 2.1 to about 0.7 and the expression 3-n is the degree of substitution of the acetyl moiety; and, drying the wet textile material containing the cellulose acetate polymeric constituent.

20. The textile material prepared according to the process of claim 19.

21. The process according to claim 19 wherein said cellulose acetate polymeric constituent has a degree of substitution of the acetyl moiety of from about 1.25 to about 2.0 and x is from about 100 to about 200.

22. The textile material prepared according to the process of claim 21.

23. The process according to claim 21 wherein said aqueous dispersion contains an effective amount of said cellulose acetate polymeric constituent to provide from about 0.01 to about 10 weight percent of said polymeric constituent on the textile material.

24. The textile material prepared according to the process of claim 23.

* * * * *

UNITED STATES PATENT OFFICE
CERTIFICATE OF CORRECTION

Patent No. 4,164,392     Dated August 14, 1979

Inventor(s) Peter Jacob Hauser and Francis William Marco

It is certified that error appears in the above-identified patent and that said Letters Patent are hereby corrected as shown below:

Column 5, line 31, the word "an" should be --any--.

Column 11, Table III, line 49, after "Stains" insert --*--.

Column 11, Table III, line 51, the first figure "0 11" should be --0--.

Column 12, Table V, line 68, the word "Treated" should be deleted.

Column 13, Table V-continued, line 6, the word "Sample" should be --Treated Sample--.

Column 13, Table V-continued, line 8, correct "Method 130-1074" to read --Method 130-1974--.

Signed and Sealed this

Twentieth Day of November 1979

[SEAL]

Attest:

RUTH C. MASON
Attesting Officer

LUTRELLE F. PARKER
Acting Commissioner of Patents and Trademarks